United States Patent [19]
Poehlmann

[11] 3,884,436
[45] May 20, 1975

[54] GAS-ACTUATED EMERGENCY PILOT RELEASE SYSTEM

[75] Inventor: Paul W. Poehlmann, Stinson Beach, Calif.

[73] Assignee: H. Koch and Sons, Inc.

[22] Filed: Nov. 19, 1973

[21] Appl. No.: 417,140

[52] U.S. Cl. ........ 244/122 A; 24/73 PH; 24/205.17; 24/230 AN; 244/141; 244/151 A
[51] Int. Cl. ..................... B64d 25/06; B64d 25/10
[58] Field of Search ..... 244/122 A, 122 R, 122 AH, 244/122 AG, 141, 151 R, 151 A, 151 B; 24/73 PH, 205.17, DIG. 26, 230 AN, 230 NP, 230 AL, 230 AV; 297/385; 403/15

[56] References Cited
UNITED STATES PATENTS

| | | | |
|---|---|---|---|
| 3,744,103 | 7/1973 | Gaylord | 244/151 A X |
| 3,767,143 | 10/1973 | Gaylord | 244/151 A |
| 3,785,597 | 1/1974 | Gaylord | 244/151 A |

Primary Examiner—Trygve M. Blix
Assistant Examiner—Barry L. Kelmachter
Attorney, Agent, or Firm—George B. White

[57] ABSTRACT

A gas-actuated release system is incorporated into a conventional ejection seat of an aircraft for freeing a pilot from his survival gear which could hinder his escape from the aircraft in a ground emergency. The system includes fail-safe features which prevent its operation when the pilot ejects from the aircraft via the ejection seat system. Flexible gas lines between the survival gear and the ejection seat are equipped with tension release connectors which pull apart upon separation of the pilot and survival gear from the ejection seat after ejection from the aircraft.

18 Claims, 23 Drawing Figures

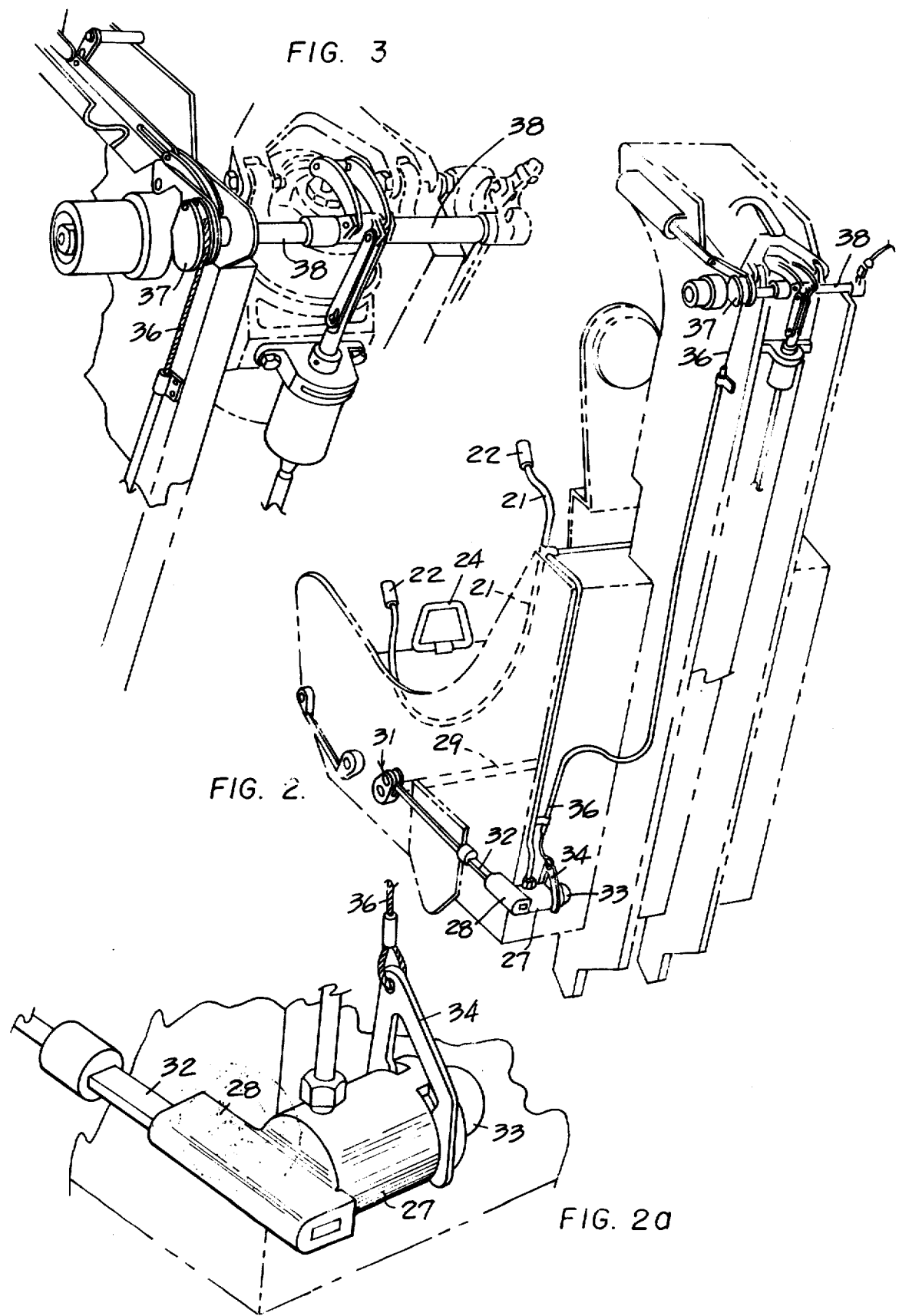

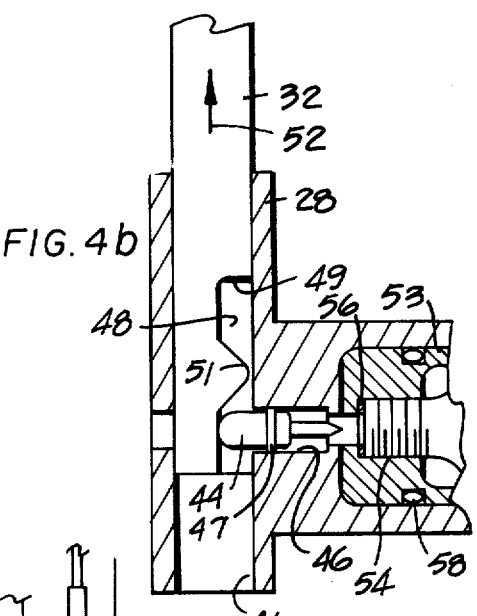
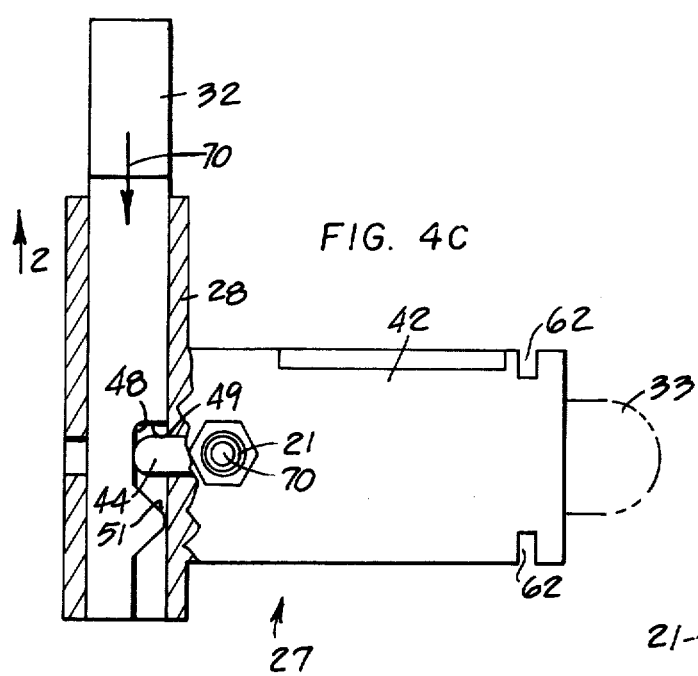
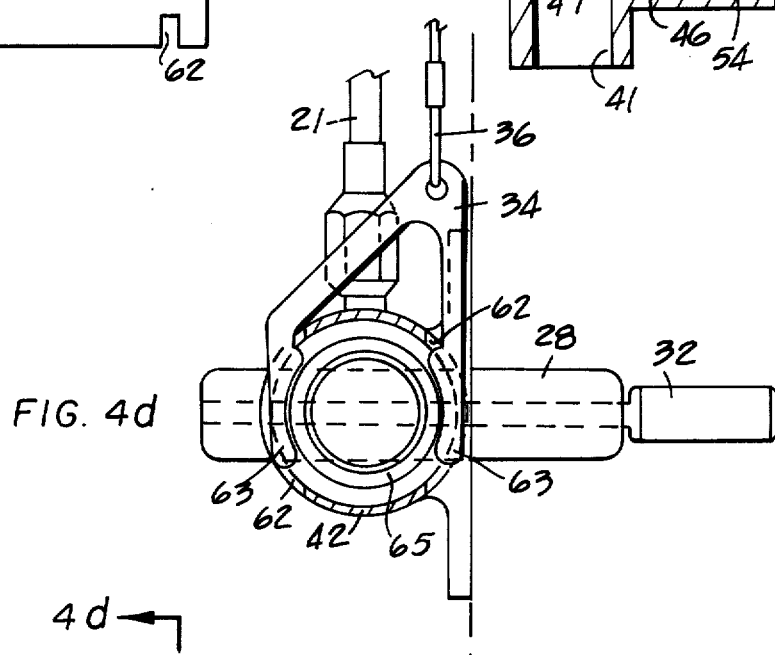
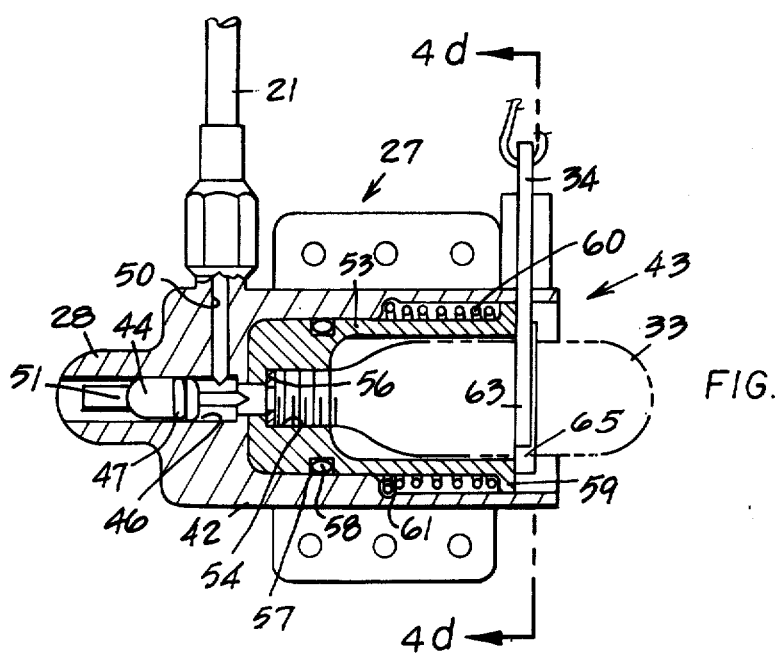

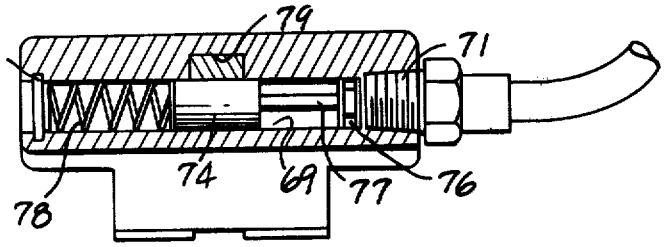
FIG. 5b
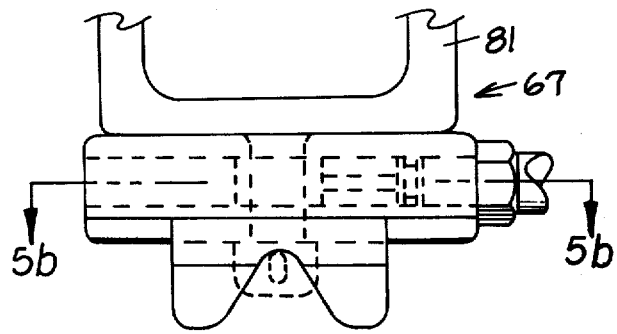
FIG. 5c
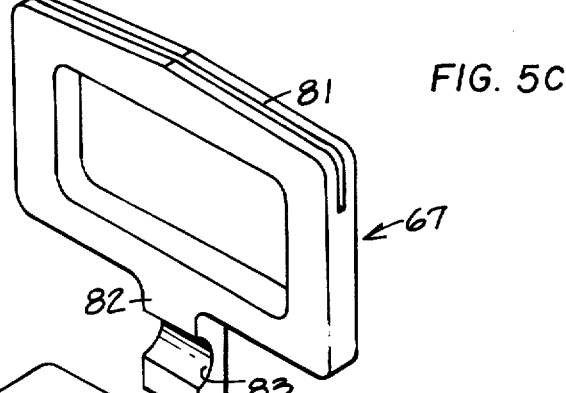
FIG. 5a
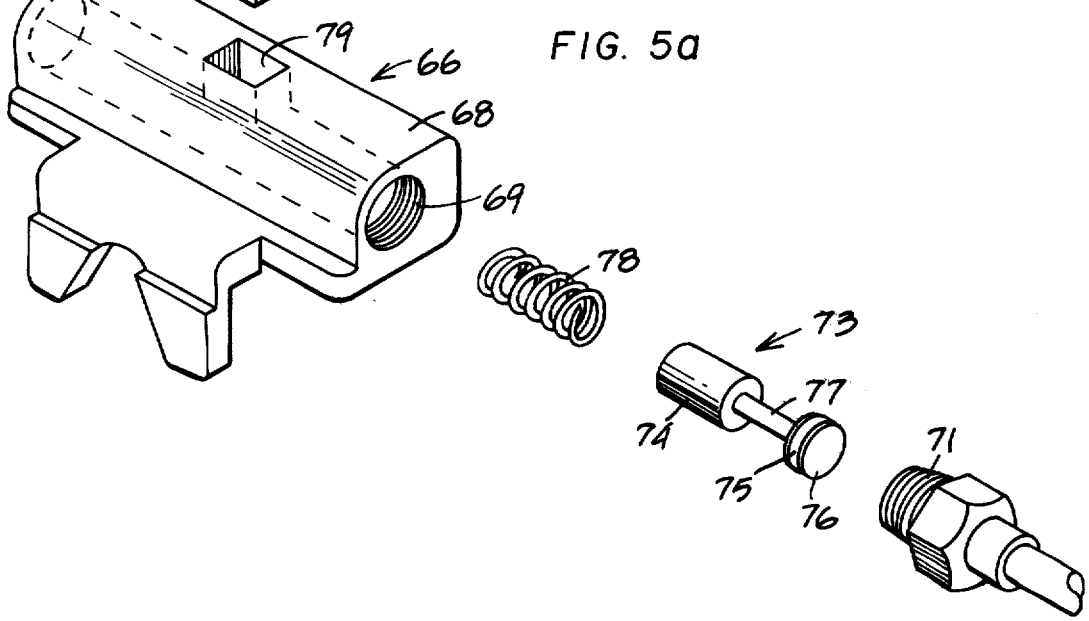

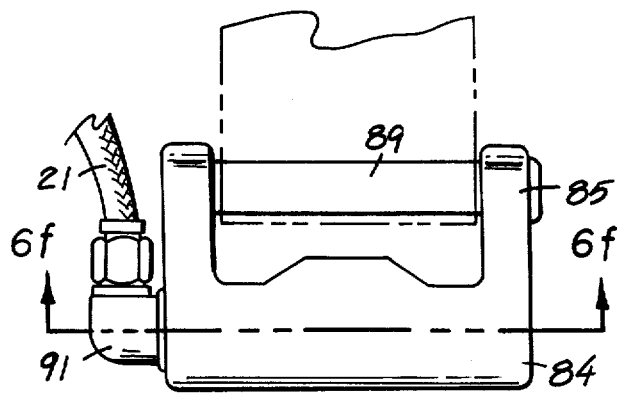
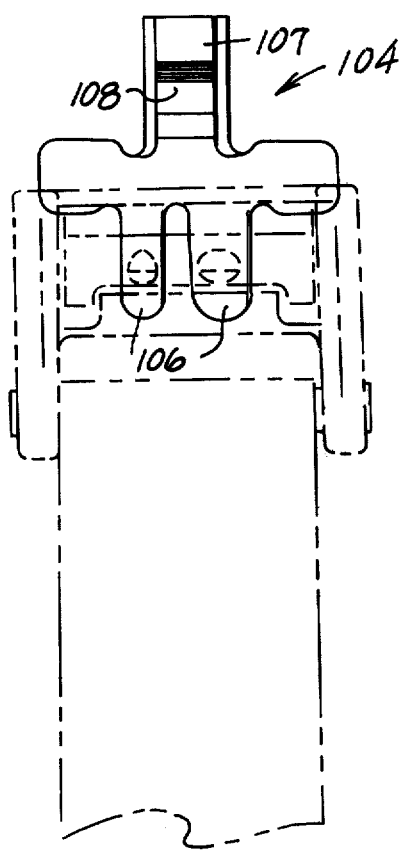
FIG. 6e
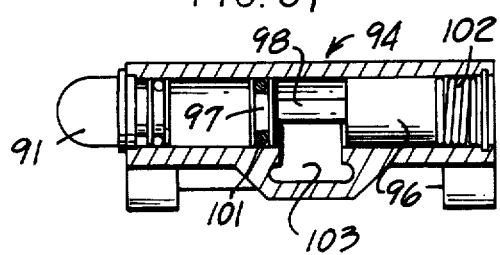
FIG. 6f

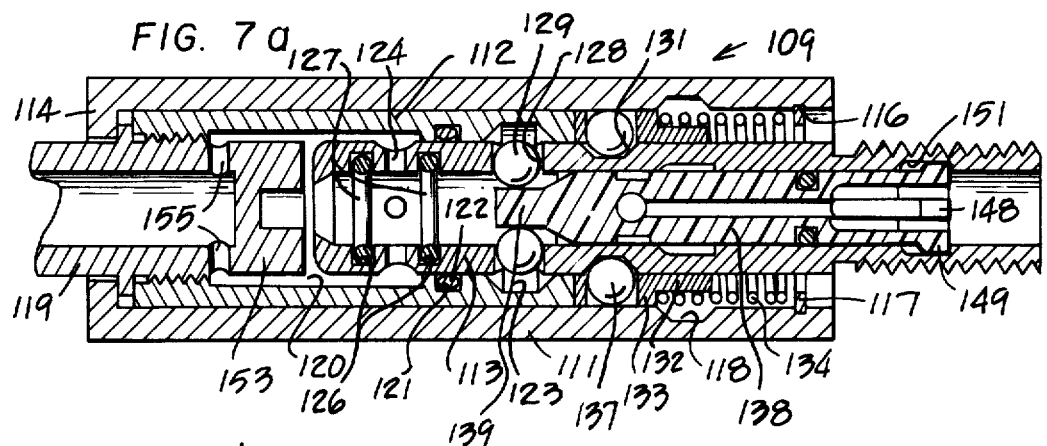
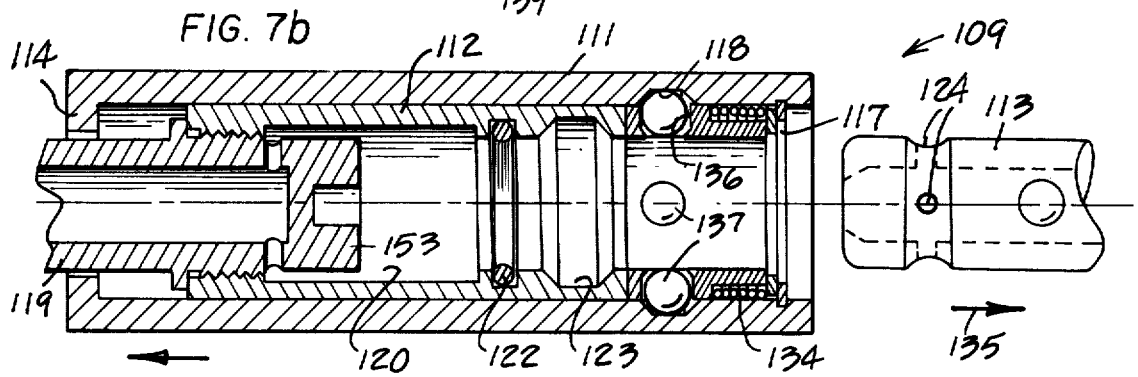
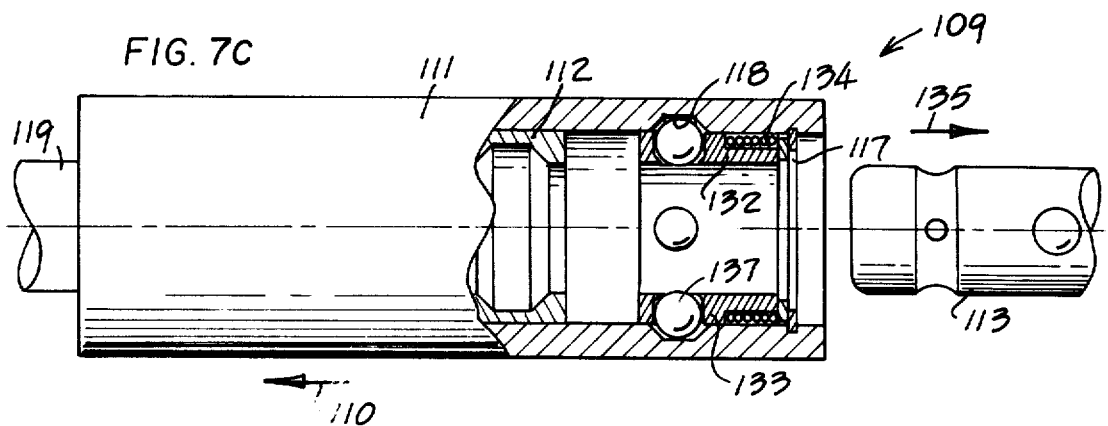
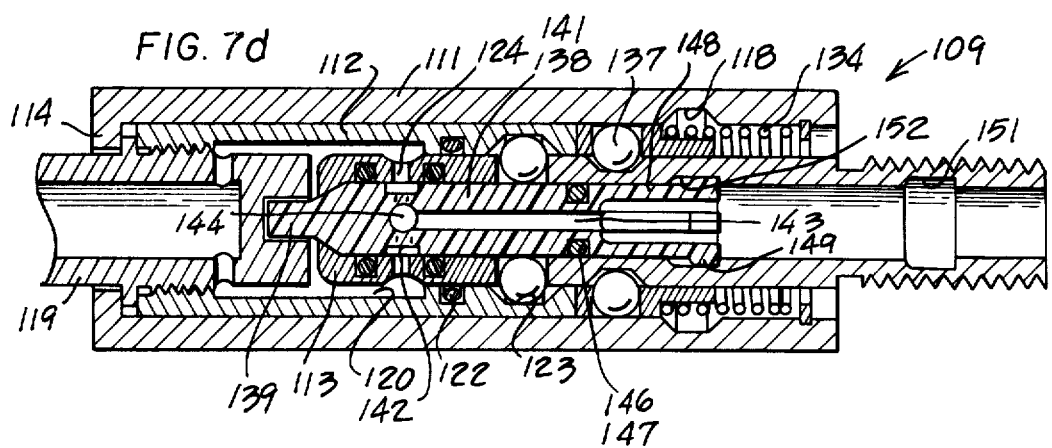

GAS-ACTUATED EMERGENCY PILOT RELEASE SYSTEM

FIELD OF THE INVENTION

The invention relates to a cold gas pressure system incorporated into a conventional ejection seat system for freeing an aircraft pilot from his survival kit and parachute canopy hindering his escape from an aircraft in a ground emergency. Particular novel features of the invented system include cold gas driven releasable latches and tension release gas line connectors. Other features of the invented system relate to a fail-safe actuator which separates the gas source from the remaining release system when the pilot utilizes the ejection seat to escape from his aircraft.

DESCRIPTION OF THE PRIOR ART

Sophisticated aircraft are equipped with ejection seat systems which enable a pilot to escape from the aircraft. In a typical ejection seat system, a parachute canopy package is secured to the seat behind the pilot. A survival kit is usually disposed in the seat of the system upon which the pilot sits. The pilot enters the cockpit of his aircraft wearing a parachute harness which he connects to the riser straps of the packed parachute and to straps of the survival kit. The pilot then secures himself in the seat with a shoulder harness, a lap belt and leg or garter straps.

Upon a ground emergency it is essential that the pilot be able to escape from the aircraft as quickly as possible. Accordingly, typical ejection seat systems are equipped with emergency ground egress release mechanisms which free the pilot from the shoulder harness, lap belt and leg restraint straps upon pulling a single lever. However, the pilot must execute separate maneuvers to separate himself from the parachute canopy and from the survival kit. Such separate maneuvers are deliberately required so as to prevent the pilot from inadvertently releasing himself from the parachute and survival kit when he ejects from the aircraft.

However, in an emergency situation on the ground with existing ejection seat systems, the pilot, after freeing himself from the ejection seat, must either attempt egress from the aircraft with his parachute and survival kit or free himself from the parachute and survival kit and then attempt egress from the aircraft.

Various release systems exist which expedite a pilot's egress from aircraft on the ground. For example, a gas-actuated release system is described in U.S. Pat. No. 3,658,281 issued to Mr. John A. Gaylord in which a pilot releases himself from his parachute harness by puncturing a high pressure gas canister mounted on the harness which then simultaneously disconnects all the strap connectors holding the harness together. The gas canister is punctured by a single manual maneuver. Another approach is exemplified by the single point parachute harness release mechanism described in U.S. Pat. No. 3,692,262 also issued to Mr. John A. Gaylord wherein all the straps of the harness are secured by a single releasable locking mechanism located at the pilot's waist.

Summarizing, existing strap release systems in ejection seats require a pilot to manually operate a minimum of two or three release mechanisms to free himself from the seat and encumbrances hindering his egress from the aircraft on the ground. In emergency ground situations where the pilot is dazed, injured or simply confused and forgetful, the time delay required for executing two or more manual maneuvers in order to escape from the aircraft can prove fatal.

In addition, if a pilot utilizes a typical ejection seat system to escape from his aircraft, he must be automatically separated from that system together with his parachute and survival kit after a short delay. Accordingly, the number of mechanical connections between the ejection seat system and the pilot, parachute or survival kit are kept to an absolute minimum because of the possibility of failure of one of the connections to release, thus tying the massive ejection seat system to the pilot after ejection. In such instances, the pilot would fall to his death inasmuch as his parachute could not support both him and the ejection seat safely.

SUMMARY OF THE INVENTION

A gas-actuated release system is incorporated into a conventional ejection seat system of an aircraft for releasing a pilot from straps connecting him to his parachute and survival kit. The release system is energized by the pilot manually operating an existing emergency ground egress release mechanism which also frees him from other devices restraining him in the ejection seat. Thus, by a single manual maneuver, a pilot can free himself from all straps and encumbrances which would hinder or slow his escape from the aircraft in case of a ground emergency.

The described gas-actuated release system includes a positive interlock mechanism which frees and ejects the gas source from the system when the pilot energizes the ejection seat mechanism for escape from the aircraft. Thus, the pilot is positively prevented from inadvertently freeing himself from his parachute and survival gear when he utilizes the ejection seat to escape from the aircraft.

Latching devices of the invented release system secure the parachute and the survival package to the parachute harness worn by the pilot and disengage responsive to gas pressure. Gas pressure is supplied by a cartridge mounted in a piercing mechanism on the body of the ejection seat. The latching devices are connected to the ejection seat by flexible high pressure conduits equipped with tension release connectors.

In particular, the tension release connectors of the invented gas-actuated release system are designed to pull apart absent gas pressurization. Thus, the described connectors enable the ejection seat to fall free of, or separate from, the pilot, together with his parachute and survival kit after ejection from the aircraft. The connectors also include means for positive locking action upon gas pressurization thus preventing inadvertent depressurization of the gas release system when it is activated.

DESCRIPTION OF THE FIGURES

FIGS. 2 and 2a show a rear view of the ejection seat showing the location of the gas lines and the piercing-decoupling interlock device of the gas-actuated release system.

FIG. 3 is a perspective view of the connection between the decoupling interlock system and the ejection release system of the ejection seat.

FIGS. 4a through f show the details of the canister piercing-decoupling interlock mechanism of the gas-actuated release system.

FIGS. 5a through f show the details of the gas-energized releasable latch for securing the survival kit to the parachute harness of the pilot.

FIGS. 6a through f show the details of the gas-energized releasable latching mechanisms between the parachute pack and the parachute harness.

FIGS. 7a, b, c & d show the details of the tension release gas line connectors.

DETAILED DESCRIPTION OF THE INVENTION

Figure 1:
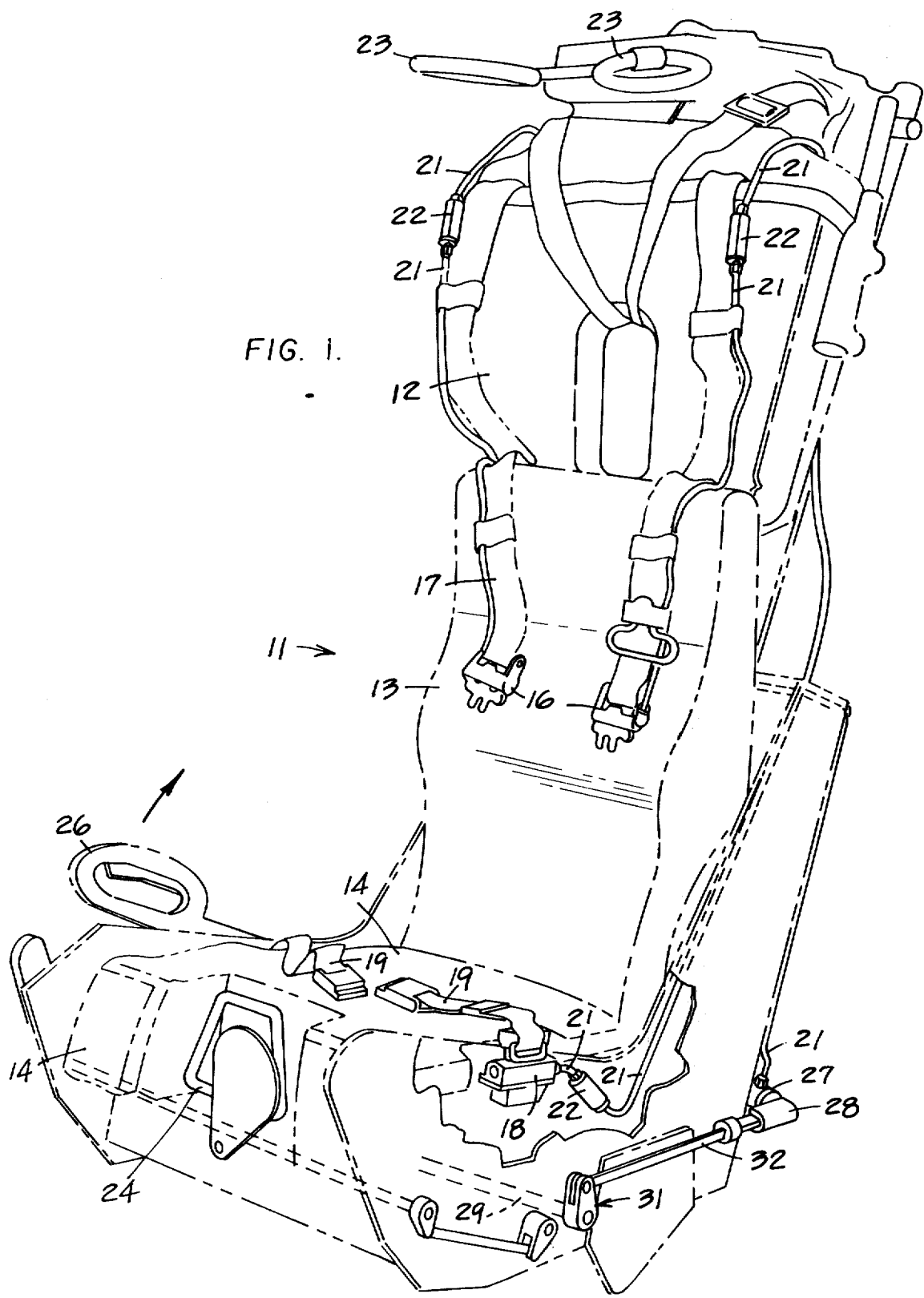
FIG. 1 is a partially cutaway perspective view of a Martin-Baker ejection seat system, showing the location of the gas-actuated latches, the flexible gas lines and the tension release gas line connectors.

Referring to FIG. 1, the conventional ejection seat system 11 is shown. A parachute pack 12 is mounted on the back of the ejection seat 11 above the back cushion 13 behind the head of the pilot if he were sitting in the seat 11. A survival pack 14 is disposed in the seat of the system 11. Gas-energized releasable latches 16 are secured to riser straps 17 to the parachute pack 12. Gas-energized releasable latches 18 mounted on the survival package 14 secure straps 19 which are adapted to be connected to a parachute harness worn by a pilot. Flexible gas lines 21 connect between the latches 16 & 18 and gas source mounted on the back of the seat system 11. Tension release gas line connectors 22 are incorporated into the flexible gas lines 21.

To eject from the aircraft, the pilot pulls either the face curtain ejection bails 23 above his head or the seat ejection bail 24 located in the center of the seat between his legs. To release himself from all straps connecting him to the ejection seat system 11, the parachute pack 12 and the survival pack 14, the pilot pulls the emergency ground egress release handle 26 upwards. As shown in FIG. 1, the strap release lever 26 is located on the right arm of the ejection seat system 11 proximate the pilot's right hand if he were sitting in the system.

DETAILED DESCRIPTION OF THE CANISTER PIERCING-DECOUPLING DEVICE

Referring now to FIGS. 2 and 2a showing the rear perspective view of the ejection seat 11 and the canister piercing-decoupling interlock device 27, the piercing mechanism 28 of the device 27 is operated by a mechanical linkage (not shown) including a rocking shaft 29 operatively connected to the release lever 26 by conventional mechanical means. In particular, pulling the release lever up causes the lever 31 on the side structure of the ejection seat system 11 to rotate clockwise pushing a bar 32 into the piercing mechanism 28 of the interlock device 27 to pierce the membrane of the canister 33 containing a high pressure gas. The details of the piercing mechanism are described below.

After the canister 33 is pierced, high pressure gas flows into rigid gas lines 30 mounted on the structure of the ejection seat system to the flexible gas lines 21. As shown in FIG. 2, the flexible gas lines 21 are disconnected from the lines going to the releasable latches at the tension release gas line connectors 22.

The interlock mechanism of the device 27 comprises a retainer clip 34 which is adapted to be pulled free of the device 27 whereupon a spring ejects the gas canister 33 from the device 27 (described below in greater detail). A cable 36 is connected between the retainer clip 34 and a pulley 37 rigidly mounted on a shaft 38.

In more detail, referring to FIG. 3, the cable 36 is secured by conventional means to the pulley 37 which is rigidly mounted on the shaft 38. The shaft 38 rotates counterclockwise when the pilot pulls either the face curtain ejection bail 23 or the seat ejection bail 24. Accordingly, when the face curtain or seat ejection bails, 23 and 24 respectively, are pulled, the cable 36 pulls the retainer clip 34 out of the interlock mechanism of the device 27 and the gas canister 33 is ejected therefrom. Thus it is impossible for the pilot to inadvertently energize the gas-actuated release system when he ejects from his aircraft in the air. However, if the ejection seat system 11 fails to operate after the pilot has pulled the ejection bails 23 & 24, the pilot can still pull the emergency ground egress release handle 26 to free himself from straps confining him to the ejection seat system 11 without freeing himself from his parachute, and survival kit, thus leaving him free to attempt to escape from his aircraft by other maneuvers.

Referring now to FIGS. 4a, b, & c, the canister piercing-decoupling interlock device 27 comprises a housing having a rectangular slot 41 for receiving the bar 32 and a hollow cylindrical housing 42 perpendicularly disposed with respect to the slot 41 for receiving a gas canister pack. A canister piercing plunger 44 is received in a cylindrical port 46 communicating between the slot 41 and the cylindrical housing 42. The cylindrical port 46 is coaxially aligned with the cylindrical housing 42. The canister piercing plunger includes an annular slot for receiving an O-ring for making a hermetic seal between the plunger 44 and the walls of the cylindrical port 46. The O-ring 47 also serves to hold the plunger 44 in a non-piercing position (see FIG. 4b).

Referring to FIGS. 4b and c, the head of the plunger 44 is rounded and projects outward from the cylindrical port 46 into the slot 41. The bar 32 has a recess 48 for receiving the rounded head of the plunger 44 (see FIG. 4c). The shoulder 49 of the recess is perpendicular with respect to the axis of the bar 32 to prevent the bar from sliding longitudinally into slot 41 in a direction indicated by the arrow 70. The other shoulder 51 of the recess 48 is inclined with respect to the axis of the bar 32 such that when the bar is pushed in a direction indicated by the arrow 52 by the mechanical linkage 29 (see FIG. 2), the plunger 44 is driven into the cylindrical port 46 and pierces the gas canister 33. The end of the bar 32 is also cutaway beyond the inclined shoulder 51 which allows gas pressure to force the plunger 44 back out into the slot 41.

Referring now to FIG. 4a, the gas canister pack 43 includes a cylindrical cup 53 with a port 54 drilled coaxially through its bottom. The port 54 is threaded for receiving a conventional high pressure gas canister 33. A conventional seal 56 is disposed between a shoulder within the port and the neck of the canister 33. The cylindrical cup 53 includes an annular slot 57 around its outside surface proximate to the closed end for receiving an O-ring seal 58 and an annular shoulder 59 at its open end of a slightly greater diameter than its outer diameter.

The gas canister pack is adapted to be inserted into the hollow housing 42. The O-ring seal 58 makes a hermetic seal between the inner walls of the housing 42 and the outer walls of the cup 53. The inner wall of the hollow cylindrical housing 42 is relieved proximate its open end to a diameter slightly greater than that of the annular shoulder 57 to provide an annular shoulder 61 within the hollow housing 42. A spring 60 is compressed between the annular shoulder 59 at the open end of the cup 53 and the annular shoulder 61 within the housing 42.

Figure 4E:
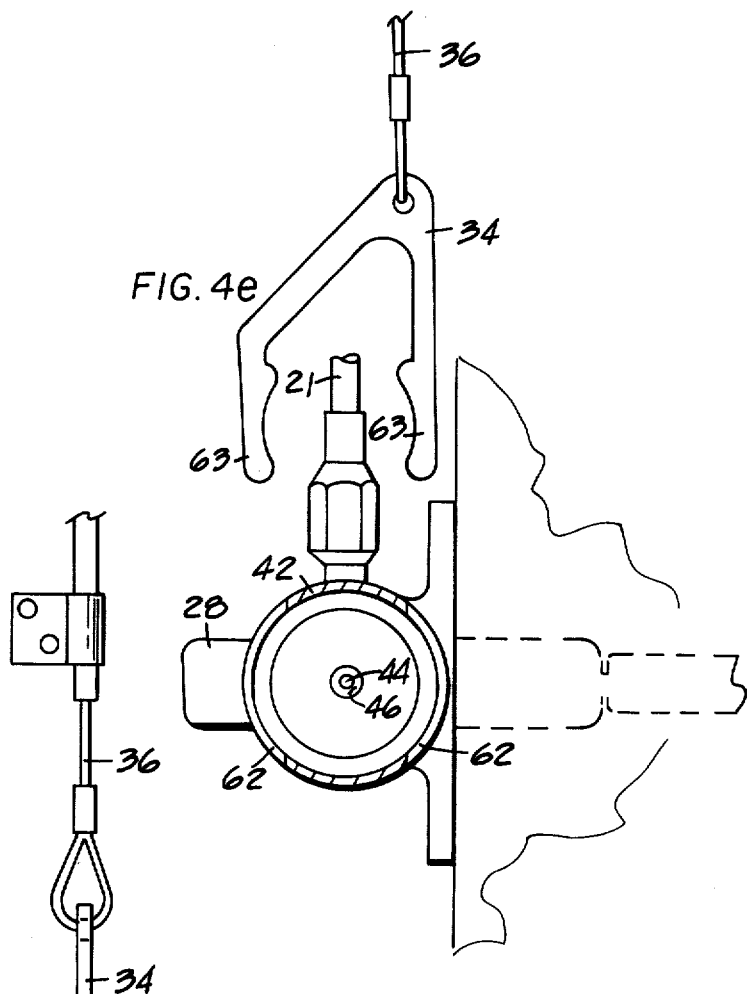
Figure 4F:
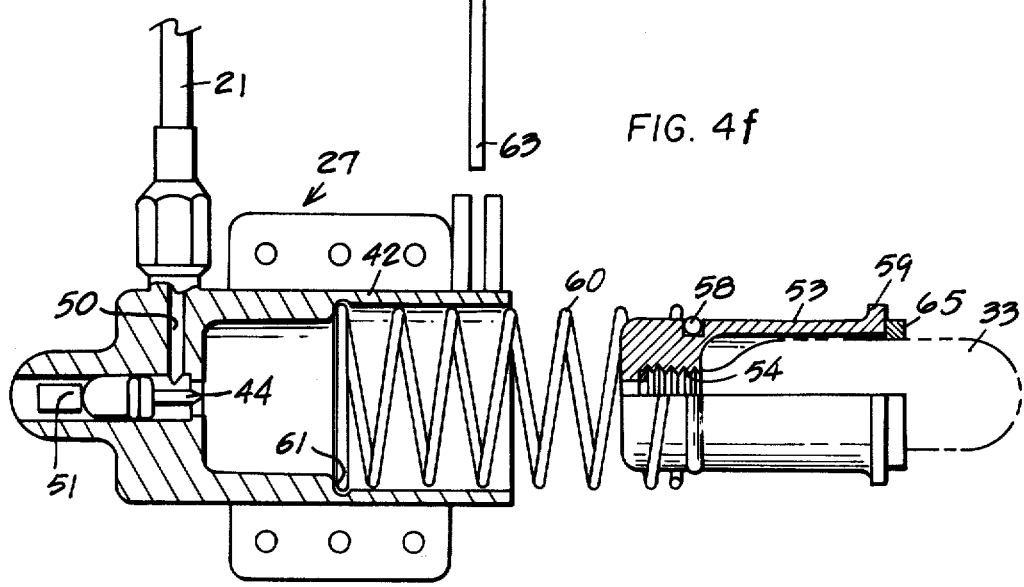
Figure 6A:
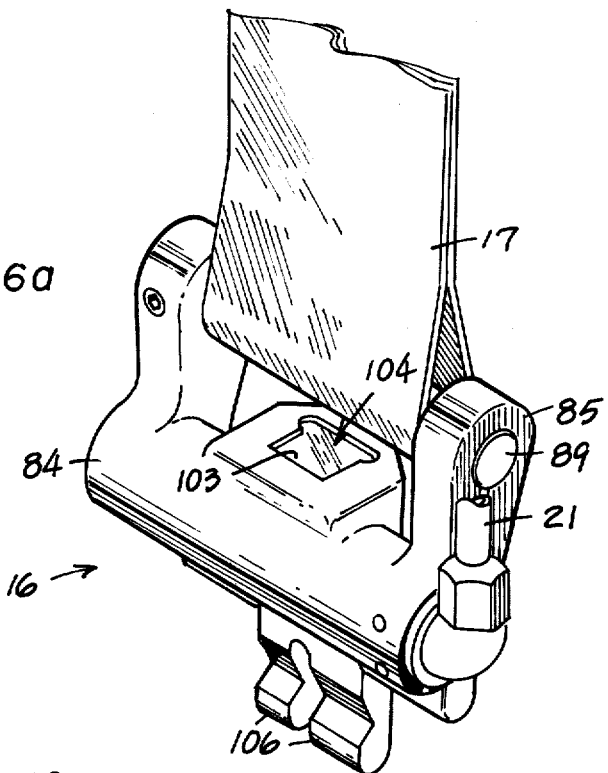
Figure 6B:
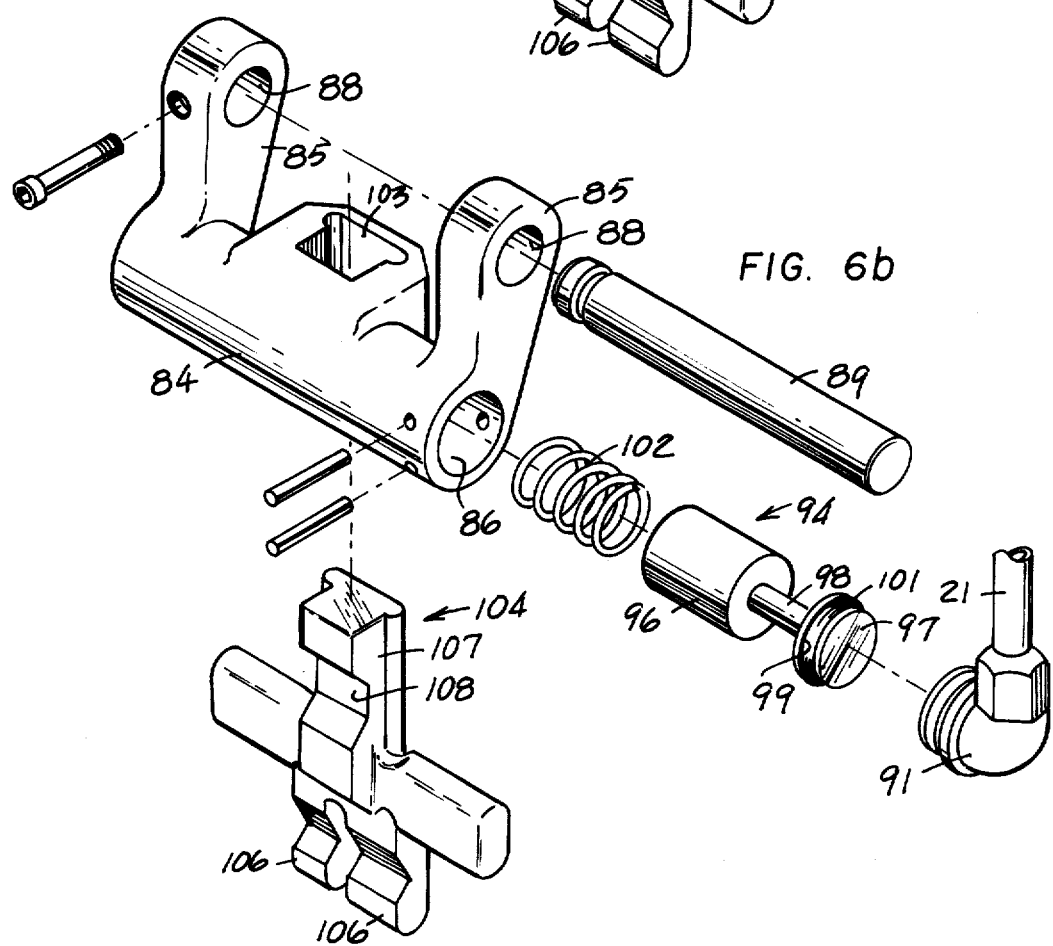
Figure 6C:
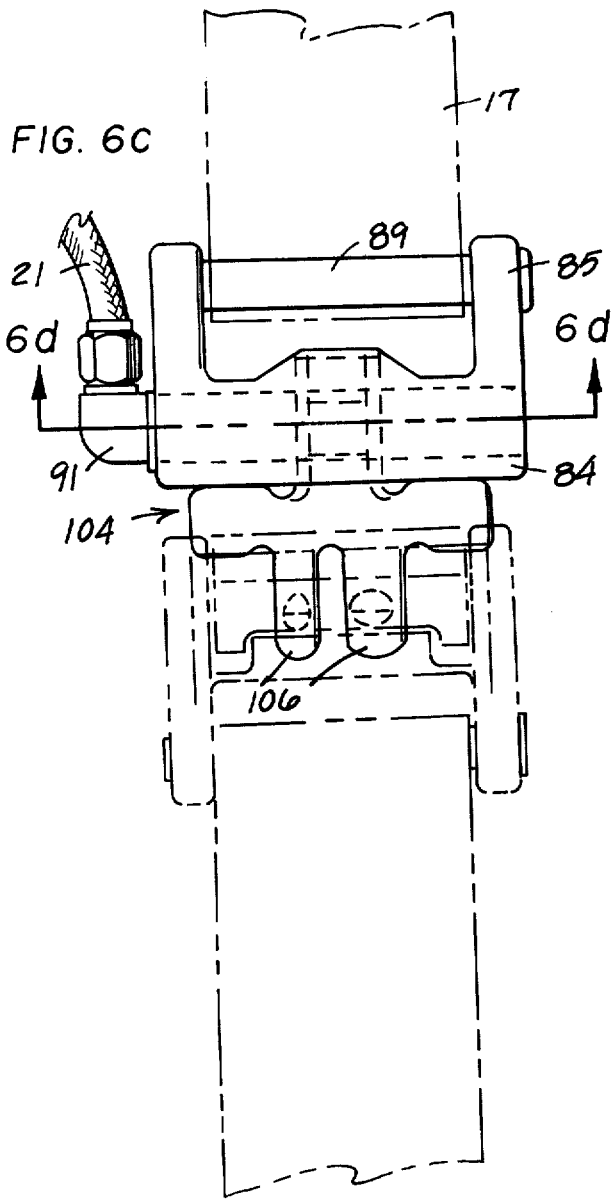
Figure 6D:
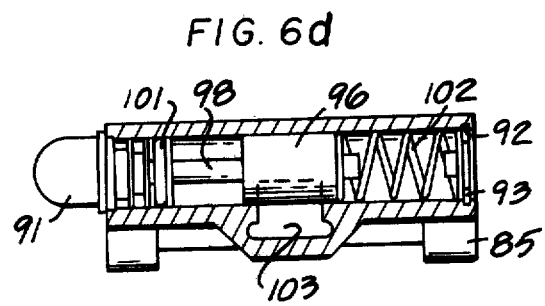

Referring to FIGS. 4d & 4e, two slots 62 are cut through the wall of the open end for receiving the prongs 63 of the retainer clip 34 (see FIG. 4c). The ends of the prongs 63 of the retainer clip 34 are adapted to clip onto a ring 65 mounted around the gas canister 33 with a slight compressive force such that the clip will not vibrate out of the slot 62. As shown in FIG. 4d, the annular shoulder 59 of the gas canister pack 43 engages the inner edge of the prongs 63 and the outer edge of the prongs 63 engage the wall of the cylindrical housing 42. Thus, the retainer clip 34 secures the gas canister pack 43 within the hollow cylindrical housing 42 of the canister piercing-decoupling interlock device 27.

The piercing mechanism of the device 27 operates in the following fashion: the pilot pulls the strap release lever 26 causing the mechanical linkage 29 to drive the bar 32 in a direction indicated by the arrow 52. The inclined shoulder 51 of the bar drives the canister piercing plunger 44 into the cylindrical port 46 piercing the diaphram on the gas canister bottle 33. The gas pressure in the canister drives the piercing plunger back out into the slot 41 and gas floods the remainder of the release system via the port 50.

The interlock mechanism of the device 27 operates in the following fashion: the pilot pulls the bail, 23 or 24, for ejecting from the aircraft, rotating the shaft 38 to pull the retainer clip 34 out of the device 27, whereupon the spring 60 compressed between the annular shoulder 59 of the gas canister pack and the annular shoulder 61 of the housing 42 ejects the gas canister pack out the open end of the housing 42. With the high pressure gas canister removed from the device 27, there is no possibility of pressurizing the remainder of the gas-actuated release system.

Description of the Gas-Energized Releasable Latch Securing the Survival Kit

Referring now to FIGS. 5a, b & c, the gas-energized releasable latch securing the survival pack 14 to the parachute harness worn by a pilot comprises a female member 66 attached to the survival package 14 and a male member 67 adapted to be secured to a strap connected to the parachute harness. In more detail, in the exploded view shown in FIG. 5a, the female member 66 comprises a solid housing 68 having a cylindrical horizontal passageway 69. One end of the passageway is threaded for receiving a conventional gas line connector 71. The other end of the passageway has an annular slot for receiving a conventional circular retaining clip 72. A locking plunger 73 disposed in the horizontal passageway 69 includes a solid cylindrical locking section 74 connected to a piston section 76 by a bar 77. A spring 78 is compressed between the circular retaining clip 72 and the cylindrical locking section 74 of the locking plunger 73 such that the piston section 76 of the plunger 73 is pushed against the gas line connector 71 (see FIG. 5b). The housing 68 includes a rectangular passageway 79 perpendicularly intersecting the cylindrical passageway 69. The rectangular passageway is adapted to receive the male member of the latch.

In particular, the male member of the latch 67 comprises a conventional rectangular bail 81 for securing a webbing strap having a rectangular latching member 82 extending perpendicularly outward therefrom. The latching member 82 has a cylindrical recess 83 proximate its extending end which has the same radial dimension as the cylindrical passageway 69 of the female member 66 such that when the latching member 82 is inserted into the rectangular passageway 79 of the female member 66, the horizontal cylindrical passageway 69 is unimpeded.

As shown in FIGS. 5b & 5c, when the described latching mechanism is locked, the latch member 82 of the male member 67 is inserted into the rectangular passageway 79 of the female member 66. The locking plunger 73 is inserted into the cylindrical passageway 69 such that its locking section is disposed at the intersection of the latching member 82 and the passageway 69, thus locking the male and female members together. The piston section 76 of the locking plunger 73 includes an annular slot 80 for receiving an O-ring 75. The O-ring makes a hermetic seal between the cylindrical walls of the passageway 69 and the piston section 76.

When the latch is energized with gas, the pressure drives the locking plunger 73 against the spring 78 moving the locking section 74 of the plunger 73 out of engagement with the latching member 82 of the male member 67. The small diameter bar 77 between the locking section and piston section of the plunger 73 is designed such that it will not engage the latching member 82. Thus, the male member will pull free of the female member.

Detailed Description of the Gas-Energized Releasable Latch Securing the Parachute Pack Referring now to FIGS. 6a through f, the latch 16 securing the riser strap 17 to the parachute pack 12 to the pilot's parachute pack comprises a solid rectangular member 84 having a cylindrical passageway 86 along its central longitudinal axis. The rectangular member 84 includes 2 integral extending flanges 85 having coaxial cylindrical holes 88 therethrough. A webbing pin 89 is received by the cylindrical holes 88 for securing the riser strap 17.

One end of the cylindrical passageway 86 is adapted to receive a conventional gas line connector elbow 91. The other end of the passageway 86 has an annular slot 92 for receiving a conventional circular retaining clip 93. A locking plunger 94 is disposed in the passageway 86. The plunger 94 includes a cylindrical locking section 96 fitting within the passageway 86 connected to a piston section 97 by a small diameter bar 98. The piston section 97 of the plunger 94 has an annular slot 99 for receiving an O-ring 101 seal for making a hermetic seal between the piston and the walls of the passageway 86. A spring 102 is disposed between the retaining clip 93 and the end of the locking section 96 of the plunger 94.

The rectangular bar 84 of the latch also has a rectangular passageway 103 which perpendicularly intersects the cylindrical passageway 86. The rectangular passageway 103 is adapted to receive a rectangular latching section 104.

In more detail, the latching section 104 comprises the male prong 106 of a conventional parachute release device having a rectangular shank 107 extending from their base. The rectangular shank 107 has a recess 108 perpendicular to its axis.

When the described latch is locked, the rectangular shank 107 of the latching section 104 is inserted into the rectangular passageway 103 through the rectangular structural member 84 such that the recess 108 coincides with the passageway 86. The locking plunger 94 is inserted into the passageway 86 such that the cylindrical locking section 96 of the plunger 94 engages the recess 108 of the latching section 104, thus preventing the latching section from being pulled free of the rectangular bar 84. The spring 102 holds the locking plunger 94 in the locking position as described above.

When the described latch is energized with pressurized gas, the locking plunger 94 is driven against the spring 102 bringing the locking section 96 up to the plunger out of engagement with the recess 108 at the end of the shank 107 of the latching section 104, thus allowing the latching section to be pulled free of the rectangular bar 84.

Description of Tension Release Gas Line Connectors

Referring now to FIGS. 7a, b & c, the tension release gas line connector 109 comprises 3 coaxial cylindrical elements fitted together. The elements starting from the outside are: a cylindrical sleeve 111, a receiving cylinder 112 and a probe element 113. The sleeve cylinder 111 has an inwardly extending annular shoulder 114 at one end and an annular slot 116 cut into the inside surface wall at the other end for receiving a conventional circular retaining clip 117. An annular groove 118 is cut into the inside wall of the sleeve 11 proximate the annular slot 116. The cylindrical receiving element 112 is coaxially fitted within the sleeve 111, and is connected by a tubular element 119 to the flexible hose from the releasable latches securing the survival kit and parachute. The configuration of the inside wall of the cylindrical receiving element is described with respect to FIG. 7a from left to right. First, there is an annular pocket 120 of relatively longitudinal width, then an annular slot 121 for receiving an O-ring seal 122, and an annular groove 123.

The probe element 113 is inserted coaxially into the cylindrical receiving element 112. The O-ring 122 makes a hermetic seal between the inside wall of the receiving element 112 and the outside surface of the probe element 113. One end of the probe 113 is adapted to be connected to a flexible gas line from the ejection seat system 11. The free end of the probe element 113 has a plurality of holes 124 which communicate from the inside volume of the probe element to the annular pocket 120 when inserted into the receiving cylinder 112. Two annular slots 126 are cut into the inside wall of the probe element 113 on either side of the holes 124 for receiving O-ring seals 127. The probe element 113 has a second row of holes 128 which come into registry with the annular recess 123 of the cylindrical receiving element 112 when the probe is inserted into the coupling. Steel locking balls 129 are disposed in the holes 128. The probe further includes an annular groove 131 around the outside surface of the probe between the holes 128 and the connected end of the probe 113.

As shown in FIG. 7a, a retaining sleeve 132 having an annular shoulder 133 with an outer diameter equal to the outer diameter of the cylindrical receiving element 112 and an inner diameter slightly greater than the outer diameter of the probe element 112 abuts against the end of the cylindrical receiving element 112 and is held in that abutting relationship by a spring 134 compressed between the circular retaining clip 117 and the extending annular shoulder 133 of the sleeve. A row of holes 136 are cut perpendicularly through the shoulder 133 of the retaining sleeve 132 for receiving steel release balls 137. The diameter of the release balls 137 is greater than the thickness of the cylindrical receiving element 112. Accordingly, when the probe element 113 is inserted into the cylindrical receiving unit 112 the release balls 137 are received in the annular recess 131 around the outside surface of the probe.

A locking plunger 138 having a small diameter section 139 and a large diameter section 141 is disposed within the probe element 113 such that the locking balls 129 disposed in the holes 128 rest on the small diameter section 139 of the plunger. An annular pocket 142 is cut around the outside surface of the plunger 138. A central passageway 143 is drilled along the longitudinal axis of the plunger and a port 144 is drilled from the annular pocket 142 to the passageway such that a gas can flow through the plunger into the pocket. The plunger 138 also has an annular slot 146 cut into its outside surface for receiving an O-ring seal 147. The O-ring makes a hermetic seal between the plunger and the inner surface of the probe element 113. The upstream end of the locking plunger comprises a plurality of extending fingers 148 having a raised section 149 at their ends. The raised sections 149 at the ends of the fingers 148 are received in an annular groove 151 cut into the inside wall of the probe element 113. The annular grooves 151 have an abrupt shoulder on the upstream side and an inclined shoulder on the downstream side of the groove. The inner wall of the probe element also includes a second annular groove 152 downstream from the groove 151.

The end of the tubular element 119 connected to the cylindrical receiving element 112 includes a solid stop 153 having a cylindrical recess for receiving the small diameter section 139 of the locking plunger 138. A plurality of ports 155 are cut through the wall of the tubular element so that gas can communicate from the annular pocket 120 into the passageway of the tubular element 119.

The described tension release gas line connector has 3 functional modes: (1) the unlatched or disconnect mode shown in FIG. 7b; (2) the tension release or breakaway mode shown in FIG. 7c; and, (3) gas communicating mode shown in FIG. 7d. The functional modes of the described connector are described in the above order.

To unlatch or disconnect the tension release gas line connector 109, the annular sleeve is moved in the direction of the arrow 110 compressing the spring 133 until the annular recess 115 comes into registry with the release balls 137 contained in the holes 136 between the abutting ends of the cylindrical receiving element 112 and the retaining sleeve 132, whereupon the probe element is pulled in the direction of the arrow 135, causing the release balls to push into the recess 118. It should be noted that in the unlatching or disconnect mode, that the cylindrical receiving element 112 and the retaining sleeve remain stationary with respect to each other. To recouple the connector, the procedure is simply repeated bringing the annular recess 115 into registry with the release balls 137 and then inserting the probe element 113.

The tension release or breakaway functional mode of the described connector can be described as follows:

the sleeve 111 and the cylindrical receiving element move together in the direction of the arrow 110. Simultaneously, the probe element moves in the direction of the arrow 135. The release balls 137 restrained by the inside surface wall of the sleeve 111 and the annular recess 131 on the outside surface of the probe 113 move with the retaining sleeve 132 until the balls 137 come into registry with the annular recess 115 and the sleeve whereupon the balls move outward and the probe pulls free of the connector.

In the gas communicating functional mode (FIG. 7d) of the connector, gas pressure drives the locking plunger 138 downstream in the direction of the arrow 110 such that the large diameter section of the plunger 141 drives the locking balls 129, disposed in the holes 128, upward into the annular recess 123 on the inside wall of the cylindrical receiving element 112, thus locking the probe and receiving element together. The stop 153 at the end of the tubular element 118 stops the plunger 134 such that its annular pocket 142 is between the two O-ring seals 127. Gas flows through the connector via the central passageway 143 through the plunger 138 out the port 144 into the annular pocket 120 through the ports 155 into the central passage of the tubular element connected to the flexible tubing going to the releasable latches. The annular groove 151 prevents the locking plunger 138 from sliding upstream in the connector prior to pressurization. Upon pressurization, the raised sections 149 of the locking fingers 148 are received in the annular groove 152 to lock the plunger in a gas communicating position.

I claim:

1. In an aircraft equipped with an ejection seat system having an emergency ground egress release mechanism and an ejection escape mechanism, both being adapted to be activated by manual maneuvers of a pilot:

an emergency pilot release system comprising in combination therewith:

a. a plurality of normally closed latching means for connecting a packed parachute canopy and a survival kit to a parachute harness worn by a pilot, said packed parachute canopy and survival kit being releasably secured to said ejection seat system;

b. energizing means mounted on said ejection seat system operatively coupled to said emergency ground egress release mechanism for releasing and opening said latching means, said emergency ground egress release mechanism being adapted to activate said energizing means;

c. fail-safe means operatively coupled to said ejection escape mechanism for disabling said energizing means, the escape mechanism being adapted to activate said fail-safe means;

d. a plurality of connector means, each connecting one of said latching means to said energizing means, said connector means each having connective elements adapted to separate responsive to a tensile stress, whereby said pilot together with said parachute and survival kit connected to his parachute harness will separate from said ejection seat system subsequent to an ejection escape from the aircraft; and e. means for positively locking said connective elements of said connector means together upon activation of said energizing means, whereby said latching means are positively connected to said energizing means upon activation of said emergency ground egress release mechanism.

2. The emergency pilot release system of claim 1 wherein said energizing means comprises in combination:

a. a canister containing a highly compressed gas having a generally cylindrical neck section and a piercable membrane disposed across that neck section;

b. a housing means mounted on said ejection seat system for holding said canister having means for piercing said membrane to release said compressed gas operatively connected to said emergency ground egress release mechanism; and c. high pressure gas conduits connected between said housing means and the plurality of connector means for receiving said compressed gas when released from said canister and directing it to said latching means, said latching means being adapted to release and open upon pressurization by said compressed gas.

3. The emergency pilot release system of claim 2 further defined in that said means for piercing said membrane comprises in combination:

a. a guide member integral with said housing having a slot oriented perpendicularly with respect to said neck section of said canister and having a passageway between said slot and said neck section of said canister, said passageway being axially aligned with said neck section of said canister;

b. a bar member received in said slot of said guide member having a first and a second recess on a side contiguous to said passageway between said slot and said neck section of said canister, said recesses being separated by a shoulder oriented perpendicularly with respect to said axis of said bar, and having inclined sides, said bar member being disposed in said slot with said first recess in registry with said passageway;

c. mechanical meanas connected between said bar member and said emergency ground egress release mechanism for moving said bar longitudinally in said slot bringing said second recess of said bar into registry with said passageway when said emergency ground egress release mechanism is activated by said pilot; and d. a piercing member disposed in said passageway of said guide member having a rounded head extending into said slot received within said first recess of said bar member and a piercing end disposed proximate to said membrane disposed across the neck section of said canister, whereby said piercing member is driven into said neck section of said canister to pierce said memberane by the shoulder between said recesses as the second recess of the bar member is moved into registry with the passageway whereupon pressure of the compressed gas forces the piercing member out of the neck section of said canister, the rounded head of said piercing member being received in said second recess in said bar member.

4. The pilot release system of claim 3 further defined in that a seal is disposed around said piercing member for making a hermetic seal betweein said piercing member and the wall of said passageway, and in that said housing has a port communicating with said passageway between the neck section of said canister and said hermetic seal, said high pressure gas conduits being connected to said port.

5. The emergency pilot release system of claim 4 further defined in that said housing means for holding said canister comprises in combination:
   a. a receiving member having a generally cylindrical cup-like configuration, said guide member being integral with the closed end of said receiving member and said passageway of said guide member being axially aligned with the axis of the receiving member;
   b. a canister pack having a general cylindrical cup-like configurations having a hole through its closed end with means for hermetically engaging the neck section of said canister, said canister having a generally cylindrical configuration and being coaxially disposed within the canister pack, which in turn is coaxially nested within said receiving member with said hole in registry with said passageway to said slot of said guide member; and
   c. a seal disposed around said canister pack for making a hermetic seal between the walls of said canister pack and the walls of said receiving member.

6. The pilot release system of claim 5 further defined in that said fail-safe means for disabling said energizing means comprises in combination:
   a. an annular shoulder around the inside wall of said cylindrical cup-like receiving member;
   b. an annular shoulder integral with the open end of said cylindrical cup-like canister pack having a greater diametric dimension than said canister pack;
   c. means disposed between said annular shoulders of said receiving member and said canister pack for ejecting said canister pack out the open end of said receiving member;
   d. releasable retaining means for securing said canister pack coaxially within said receiving member; and
   e. means operatively connected to said ejection escape mechanism of said ejection seat for releasing said releasable retaining means when said ejection escape mechanism is activated by said pilot whereby said canister pack is ejected out the open end of said receiving member thus positively decoupling the canister containing said highly compressed gas from said emergency pilot release system.

7. The pilot release system of claim 6 further defined in that said means disposed between said annular shoulders of said receiving member and said canister pack for ejecting said canister pack out the open end of said receiving members comprises a helical spring disposed around the outside wall of said canister pack compressed between said annular shoulders.

8. The pilot release system of claim 7 further defined in that the canister has an annular ring coaxially disposed around a portion of the canister which extends out the open end of said canister pack, said releasable retaining means seating on said ring.

9. The pilot release system of claim 8 further defined in that
   a. said cylindrical cup-like receiving member has two diametrically opposed slots through its walls proximate its opened end;
   b. said releasable retaining means comprises a clip having two extending prongs, said prongs having cylindrical seating sections at their respective ends adapted to grip said ring around said canister with a slight compressive force, said clip being clipped to said canister through said diametrically opposed slots defined through the walls of the receiving member, said spring being compressed between the respective annular shoulder of the receiving member and the canister pack forcing the annular shoulder at the open end of the canister pack into engagement with the extending prongs of said clip which are in turn rigidly held by said slots whereby said clip secures said canister pack within said receiving member; and
   c. said means for releasing said releasable retaining means is connected to said clip and pulls said clip free of said receiving member whereupon said spring ejects said canister pack out the opened end of said receiving member.

10. The release system of claim 9 further defined in that said means operatively connected to said ejection escape mechanism for pulling said clip free of said receiving member comprises a cable connected between said clip and said ejection escape mechanism.

11. The emergency pilot release system of claim 2 wherein each of said normally closed latching means comprise in combination:
   a. a female member having a receiving passageway and a locking passageway perpendicularly intersecting said receiving passageway, said locking passageway having means for engaging a high pressure gas conduit at a first end and an inwardly extending annular shoulder at a second end;
   b. a male member having an extending shank, said shank having a recess oriented perpendicularly with respect to its longitudinal axis proximate its end, said shank being received in said receiving passageway of same female member with said recess in registry with said locking passageway perpendicularly intersecting said receiving passageway;
   c. a latch member disposed in said locking passageway of said female member having a latching section, a piston section and a small diameter bar connecting said latching section to said piston section;
   d. a spring disposed between said inwardly extending annular shoulder at the second end of said locking passageway and the latching section of the latch member for holding said latch section in registry with the intersection of said locking and receiving passageways to thereby secure said shank of said male member in said receiving passageway of said female member, whereby a compressed gas introduced into said locking passageway via a high pressure gas conduit connected to the first end of the locking passageway longitudinally in said locking passageway against said spring moving the latch section of the latch member out of registry with the intersection of said receiving and locking passageways thereby releasing the shank of the male member in the receiving passageway of the female member whereupon the compressed gas forces said shank out of said receiving passageway.

12. The pilot release system of claim 11 further defined in that
   a. the female member of at least two of said normally closed releasable latching means are adapted for connection to riser straps from said packed parachute canopy; and b. the male members for said female members adapted for connection to the parachute riser straps include prongs axially extending from said shank adapted for engagment in a manual release mechanism connected to the parachute harness worn by the pilot.

13. The pilot release system of claim 11 further defined in that a. at least two of said female members of said normally closed releasable latching means are adapted to be mounted on said survival kit on opposite sides thereof; and b. said male members for said female members secured to said survival kit have a rectangular bail structure securing a strap, said strap having means for connection to said parachute harness worn by the pilot.

14. The pilot release system of claim 2 further defined in that each of said connector means further includes:

a. a first flexible high pressure gas conduit having a first end connected to said conduit from said energizing means and a second end connected to one of said connective elements of said connector means;

b. a second flexible high pressure gas conduit having a first end connected to said normally closed latching means and a second end connected to another of said connective elements of said connector means in axial alignment with said second end of said first flexible high pressure conduit, whereby, when said pilot, parachute canopy and survival kit separate from the ejection seat system subsequent to an ejection escape from the aircraft a tensile stress is applied along a breakway axis of the connector means, whereupon said connector means pulls apart.

15. The pilot release system of claim 14 further defined in that said connective elements of said connector means comprise, in combination, a. a cylindrical sleeve having annular shoulders extending inwardly at a first end and a second end and having an annular groove cut into its inside wall proximate to said second end, b. a hollow receiving cylinder coaxially disposed within said cylindrical sleeve having means for connection to said second end of said second flexible high pressure gas conduit at a first end and an annular locking groove cut into its inside wall proximate a second end, said gas conduit adapted to extend coaxially out of said first end of said cylindrical sleeve, c. a hollow, cylindrical retaining element disposed coaxially within said sleeve abutting against the second end of said receiving cylinder, said retaining sleeve having an annular shoulder section with an outer diametric dimension approximately equal to the inner diametric dimension of said cylindrical sleeve and having a sleeve section with a diametric dimension less than that of the cylindrical sleeve, said annular shoulder section of said retaining element having a circular row of holes each containing a ball, said balls having a greater diametric dimension than the thickness dimension of said annular shoulder section of said retaining element, d. a spring disposed around said sleeve section of the retaining element adapted to be compressed between said shoulder section of the retaining element and the inwardly extending annular shoulder at said second end of said cylindrical sleeve, e. a probe member having a central passageway received coaxially within the receiving cylinder and the retaining element having a first end and a second end extending axially out the second end of the cylindrical sleeve having means for connection to said second end of said first flexible high pressure gas conduit and having a circular row of holes each containing a ball, said balls having a greater diametric dimension than the thickness dimension of said probe member, said circular row of holes containing said balls being in registry with said annular locking groove within the receiving cylinder, said probe member further having an annular connecting groove in its outside wall located in registry with the circular row of holes containing the balls in said shoulder section of said retaining element, whereby said balls within said holes of said retaining element rest on the inside wall of said cylindrical sleeve and extend into said annular connecting groove around said probe member mechanically coupling said probe member to said retaining element such that the spring disposed between the annular shoulder section of said retaining element and the inwardly extending shoulder of the second end of the cylindrical sleeve resists tensile stresses tending to separate the probe member and the receiving cylindrical until the annular groove cut into the inside wall of the cylindrical sleeve comes into registry with the circular row of holes containing balls in the annular shoulder section of the retaining element whereupon said balls move outward into said annular groove thereby releasing the mechanical coupling between the probe member and the retaining element allowing said probe member to pull free of said coupling, and further defined in that said means for positively locking said connective elements of said connecting means together comprises, in combination therewith, a locking plunger disposed in said central passageway of said probe member having a small diameter section disposed in registry with said circular row of holes containing balls in said probe member separated from a large diameter section with a diametric dimension approximately equal to the inner diametric dimension of said passageway by an inclined section, said plunger further having an annular pocket around the large diameter section, and a fluid passageway partially through its large diameter section, and a port between said fluid passageway and said annular pocket, whereby a gas introduced into said probe member via a fluid conduit connected to the second end of the probe member drives said plunger into a locking position in said central passageway of said probe member, with the large diameter section of the plunger in registry with the circular row of holes through the probe member, the balls contained therein being forced outward into the annular locking groove of the receiving cylinder to thereby positively mechanically couple the probe member to the receiving cylinder, said gas flowing through the connector via the fluid passageway through the plunger, out the port into the annular pocket and into the receiving cylinder and out a high pressure conduit connected to the receiving cylinder.

16. The pilot release system of claim 15 further defined in that
  a. said probe member includes a circular row of ports proximate its first end;
  b. said receiving cylinder includes a stop for arresting translation of said locking plunger within the central passageway of said probe member when the annular pocket around said locking plunger moves into registry with said ports;
  c. said receiving cylinder has a relieved annular section cut into its inside wall proximate its first end, whereby an annular plenum is defined around the first end of said probe member in registry with its circular row ports; and
  d. said receiving cylinder further has a plurality of ports communicating between the annular plennum and a fluid conduit connected to the first end of the receiving cylinder.

17. The pilot release system of claim 16 further defined in that
  a. the locking plunger and the central passageway of the probe member each have a generally cylindrical configuration;
  b. the locking plunger further includes a plurality of fingers extending from the large diameter section parallel the axis of the plunger, each of said fingers having a raised section at their distal end; and
  c. the central passageway of said probe member has a first annular keeper groove proximate its second end receiving said raised sections on the end of said fingers for keeping the small diameter section of said locking plunger in registry with said circular row of holes through said probe member, and has a second annular keeper groove for receiving said raised sections on the end of said fingers when the plunger is driven to the locking position within the central passageway and for keeping said plunger in said locking position.

18. The pilot release system of claim 17 further defined in that
  a. a first annular seal is disposed within said receiving cylinder for making a hermetic seal between the probe member and the inside wall of the receiving cylinder;
  b. a second annular seal is disposed within said central passageway of the probe member between the first end thereof and the circular row of ports therethrough; and
  c. a third annular seal is disposed within said central passageway of the probe member between the circular row of ports and the circular row of holes containing balls, whereby said second and third seals from hermetic seals between the walls of the central passageway and the large diameter section of the locking plunger when said plunger is translated into the locking position.

* * * * *